US012415257B2

(12) United States Patent
Minor et al.

(10) Patent No.: US 12,415,257 B2
(45) **Date of Patent: *Sep. 16, 2025**

(54) NUT DRIVER TOOL

(71) Applicant: Klein Tools, Inc., Lincolnshire, IL (US)

(72) Inventors: Austin Minor, Fort Worth, TX (US); Jordan L. Fisher, Arlington, TX (US); Michael D. Bronk, Arlington, TX (US)

(73) Assignee: Klein Tools, Inc., Lincolnshire, IL (US)

( * ) Notice: Subject to any disclaimer, the term of this patent is extended or adjusted under 35 U.S.C. 154(b) by 402 days.

This patent is subject to a terminal disclaimer.

(21) Appl. No.: 17/675,291

(22) Filed: Feb. 18, 2022

(65) Prior Publication Data

US 2022/0168871 A1 Jun. 2, 2022

Related U.S. Application Data

(62) Division of application No. 16/891,128, filed on Jun. 3, 2020, now Pat. No. 11,318,591.

(51) Int. Cl.
*B25B 23/00* (2006.01)
*B25B 13/06* (2006.01)

(52) U.S. Cl.
CPC ........ *B25B 23/0035* (2013.01); *B25B 13/065* (2013.01)

(58) Field of Classification Search
CPC .... B25B 23/0035; B25B 13/065; B25B 13/06
See application file for complete search history.

(56) References Cited

U.S. PATENT DOCUMENTS

| | | | | | |
|---|---|---|---|---|---|
| 1,289,558 | A * | 12/1918 | Sedgley | B25B 13/56 | 81/124.5 |
| 1,371,350 | A * | 3/1921 | Campbell | B25G 1/085 | 81/177.4 |
| 1,416,461 | A * | 5/1922 | Hance | B25F 1/02 | 81/177.85 |
| 1,469,589 | A * | 10/1923 | Palmer | B25B 13/06 | 81/177.4 |
| 1,662,424 | A * | 3/1928 | Judge | B25B 13/56 | 81/177.4 |
| 2,008,367 | A * | 7/1935 | Rhinevault | B25B 23/0035 | 403/328 |
| 2,776,589 | A * | 1/1957 | Gregory | B25B 13/56 | 81/177.4 |
| 4,798,111 | A * | 1/1989 | Cheeseman | B25B 13/06 | 81/177.4 |
| 6,330,844 | B1 * | 12/2001 | Walker | B25B 15/02 | 81/439 |
| 6,374,711 | B2 * | 4/2002 | Anderson | B25F 1/02 | 81/439 |

(Continued)

*Primary Examiner* — David B. Thomas

(57) ABSTRACT

A nut driver includes an elongate drive shank and a reversible socket. The socket has a first hex socket opening sized to engage a hexagonal profile of a first size, and a second hex socket opening sized to engage a hexagonal profile of a second size that is larger than the first size. The socket is mountable on the drive shank in either a first orientation that presents the first hex socket opening for use, or a second orientation that presents the second hex socket opening for use. Additionally, in the first orientation, the socket is mountable in either a screw head receiving position or a drive bit receiving position.

9 Claims, 10 Drawing Sheets

(56) References Cited

U.S. PATENT DOCUMENTS

| | | | | |
|---|---|---|---|---|
| 6,418,821 | B1 * | 7/2002 | Yamakawa | B25B 23/0035 81/437 |
| 7,334,502 | B1 * | 2/2008 | Durkee | B25G 1/085 81/20 |
| 7,434,494 | B1 * | 10/2008 | Snider | B25B 13/102 81/177.4 |
| 8,196,495 | B2 * | 6/2012 | Chen | B25B 23/12 81/125 |
| 8,695,461 | B2 * | 4/2014 | Moss | B25B 13/56 81/125 |
| 9,981,366 | B2 * | 5/2018 | Todd | B25B 23/12 |
| 10,029,352 | B2 * | 7/2018 | Yang | B25G 1/043 |
| 11,318,591 | B2 * | 5/2022 | Minor | B25B 23/0035 |
| 2005/0098001 | A1 * | 5/2005 | Walker | G09F 3/00 81/439 |
| 2010/0101380 | A1 * | 4/2010 | Chen | B25B 23/12 81/125 |
| 2019/0009392 | A1 * | 1/2019 | Violette | B25B 15/02 |
| 2019/0091840 | A9 * | 3/2019 | Todd | B25B 23/16 |

* cited by examiner

NUT DRIVER TOOL

CROSS-REFERENCE TO RELATED APPLICATIONS

This application is a divisional of U.S. application Ser. No. 16/891,128 filed Jun. 3, 2020, the entire disclosure of which is incorporated herein by reference.

BACKGROUND OF THE DISCLOSURE

The present disclosure relates nut drivers, and more specifically to nut drivers that utilize a reversible socket. Such nut drivers are known and include nut drivers that utilize a drive shank that can receive a reversible socket in either a first orientation or a second orientation, with each orientation of the reversible socket providing a different socket size than the other orientation. It is also known for such drivers to allow the reversible socket to be mounted at two different positions along the length of the drive shank in at least one of the first or second orientations to allow the socket to drive a nut in one of the positions along the length and to receive a drive bit in the other of the positions along the length. While such known drivers are suitable for their intended purpose, there is always room for improvement, especially with respect to simplicity, reliability, and/or cost to manufacture and assemble. For example, some of the currently known drivers require many different socket components and are relatively complex constructions.

BRIEF SUMMARY OF THE DISCLOSURE

In accordance with one feature of this disclosure, a nut driver tool includes an elongate drive shank and a reversible socket. The elongate drive shank includes a socket-mounting end opposite a driver engagement end, a socket stop surface facing the socket-mounting end and spaced from the socket-mounting end, and a detent located between the socket-mounting end and the first pair of socket stop surface. The reversible socket includes a first end opposite a second end; a first hex socket opening in the first end and sized to engage a hexagonal profile of a first size; a second hex socket opening in the second end and sized to engage a hexagonal profile of a second size larger than the first size, the second hex socket facing in an opposite direction from the first hex socket opening; a through opening connecting the first and second hex socket openings; a first stop surface facing the first end; a second stop surface facing the second end; a first detent engagement feature located between the second end and the second stop surface; and a second detent engagement feature located between the first stop surface and the second stop surface. The first detent engagement feature is configured to engage the detent with the socket in a first position wherein the shank extends through the second hex socket opening with the socket-mounting end spaced from the first end by a first predetermined distance. The second detent engagement feature being configured to engage the detent with the socket in either a second position or a third position. In the second position, the socket stop surface is abutted against the second stop surface and the shank extends through the second hex socket opening with the socket-mounting end spaced from the first end by a second predetermined distance that is less than the first predetermined distance. In the third position, the socket stop surface is abutted against the first stop surface and the shank extends through the first hex socket opening with the socket-mounting end spaced from the second end by a third predetermined distance.

As one feature, the socket further includes a first linear groove extending from the first end to the first stop surfaces, and a second linear groove extending from the second end to the second stop surfaces. In a further feature, the linear grooves are formed in inwardly facing, planar surfaces of the socket. In alternate feature, the linear grooves are formed at intersections of inwardly facing, planar surfaces of the socket.

According to one feature, the shank includes an elongate rib having an end that defines the socket stop surface.

In one feature, the rib extends along a planar surface of the shank.

As one feature, the rib extends along an intersection of two planar surfaces of the shank.

In accordance with one feature of this disclosure, a nut driver tool includes an elongate drive shank and a reversible socket. The elongate drive shank includes a socket-mounting end opposite a driver engagement end, a pair of socket stop surfaces facing the socket-mounting end and spaced from the socket-mounting end, and a detent located between the socket-mounting end and the first pair of socket stop surface. The reversible socket includes a first end opposite a second end; a first hex socket opening in the first end and sized to engage a hexagonal profile of a first size; a second hex socket opening in the second end and sized to engage a hexagonal profile of a second size larger than the first size, the second hex socket facing in an opposite direction from the first hex socket opening; a through opening connecting the first and second hex socket openings; a pair of first stop surfaces facing the first end; a pair of second stop surfaces facing the second end; a first detent engagement feature located between the second end and the pair of second stop surfaces; and a second detent engagement feature located between the pairs of first and second stop surfaces. The first detent engagement feature is configured to engage the detent with the socket in a first position wherein the shank extends through the second hex socket opening with the socket-mounting end spaced from the first end by a first predetermined distance. The second detent engagement feature being configured to engage the detent with the socket in either a second position or a third position. In the second position, the socket stop surfaces are abutted against the second stop surfaces and the shank extends through the second hex socket opening with the socket-mounting end spaced from the first end by a second predetermined distance that is less than the first predetermined distance. In the third position, the socket stop surfaces are abutted against the first stop surfaces and the shank extends through the first hex socket opening with the socket-mounting end spaced from the second end by a third predetermined distance.

As one feature, the first detent engagement feature includes at least one relief formed in an inwardly facing, planar surface of the socket; and the second detent engagement feature includes at least one relief formed in an inwardly facing planar surface of the socket.

According to one feature, the first detent engagement feature includes a plurality of reliefs formed in inwardly facing planar surfaces of the socket, and the second detent engagement feature includes a plurality of reliefs formed in inwardly facing planar surfaces of the socket.

In one feature, the second detent engagement feature includes an annular groove formed in an inwardly facing, cylindrical surface of the socket.

As one feature, the socket further includes a first pair of linear grooves extending from the first end to the first stop surfaces, and a second pair of linear grooves extending from the second end to the second stop surfaces.

According to one feature, the linear grooves are formed in inwardly facing, planar surfaces of the socket.

As one feature, the linear grooves are formed at intersections of inwardly facing, planar surfaces of the socket.

In one feature, the socket further includes:

two pairs of additional first stop surfaces that extend in a plane defined by the pair of first stop surfaces;

two additional pairs of linear grooves that extend from the first end to the two pairs of additional first stop surfaces;

two pairs of additional second stop surfaces that extend in a plane defined by the pair of second stop surfaces; and two additional pairs of linear grooves that extend from the second end to the two pairs of additional second stop surfaces. In a further feature, the shank further includes two pairs of additional socket stop surfaces that extend in a plane defined by the pair of stop surfaces.

According to one feature, the through opening has a hexagonal shaped cross-section sized to engage a hexagonal profile of the first size.

As one feature, the shank has a socket engagement portion extending over a length adjacent the socket-mounting end, the socket engagement portion having a hexagonal profile sized to engage the hexagonal profile of the through opening.

In one feature, the shank has a driver engagement portion extending over a length adjacent the driver engagement end, the driver engagement portion having a hexagonal profile of the same size as the socket engagement portion.

According to one feature, the shank has a cylindrical shape extending over a length between the socket engagement portion and the driver engagement portion.

As one feature, the shank includes a pair of elongate ribs, each rib having an end that defines one of the socket stop surfaces.

In one feature, each of the ribs extends along a planar surface of the shank.

As one feature, the detent extends outwardly from one of the planar surfaces of the shank.

According to one feature, each of the ribs extends along an intersection of two planar surfaces of the shank.

In one feature, the detent is a spring biased ball detent.

As one feature, the shank further includes a magnet defining the socket-mounting end.

According to one feature, the first size is ¼ inch and the second size is 5⁄16 inch.

It should be understood that the inventive concepts disclosed herein do not require each of the features discussed above, may include any combination of the features discussed, and may include features not specifically discussed above.

DETAILED DESCRIPTION OF PREFERRED EMBODIMENTS

Figure 2:
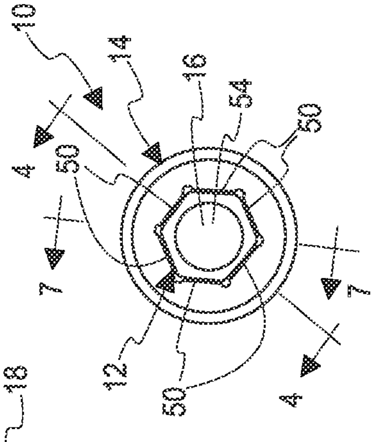
FIG. 2 is a front end view of the nut driver tool of FIG. 1.
Figure 1:
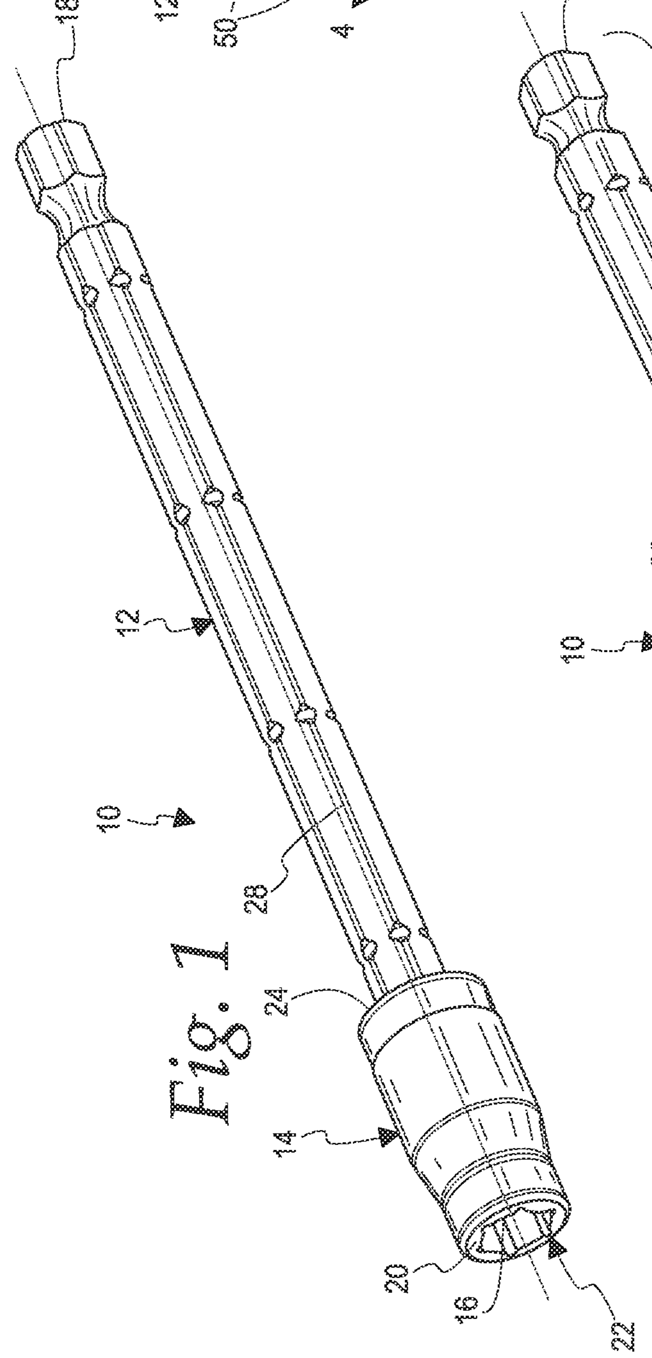
FIG. 1 is a perspective view of a nut driver tool according to this disclosure.
Figure 3:
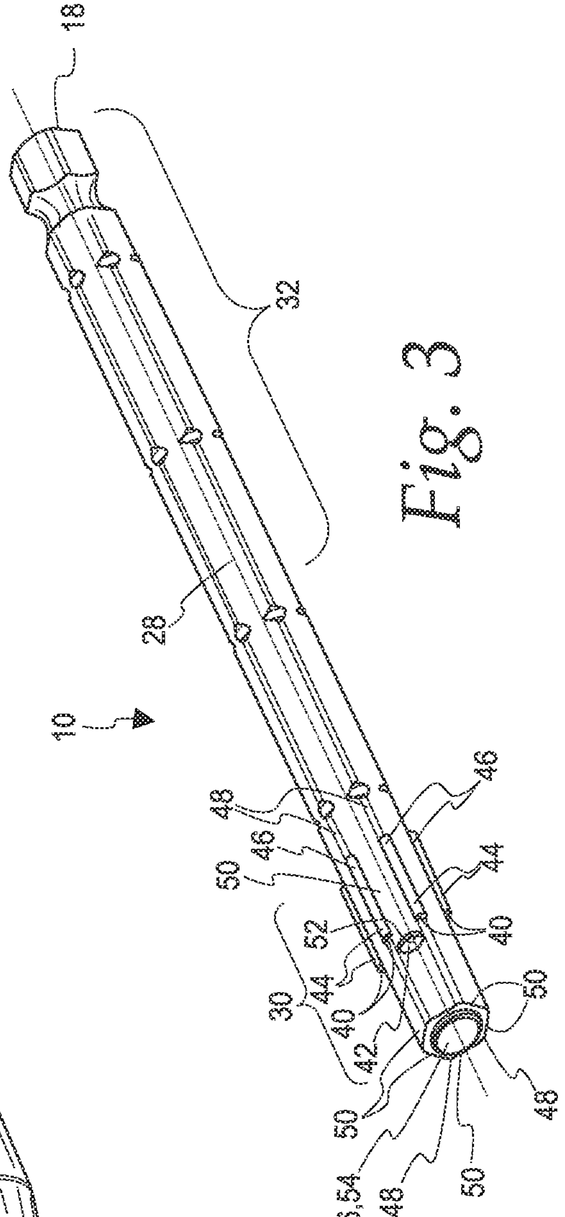
FIG. 3 is a perspective view of a drive shank of the nut driver tool of FIG. 1.
Figures 4, 5, 6:
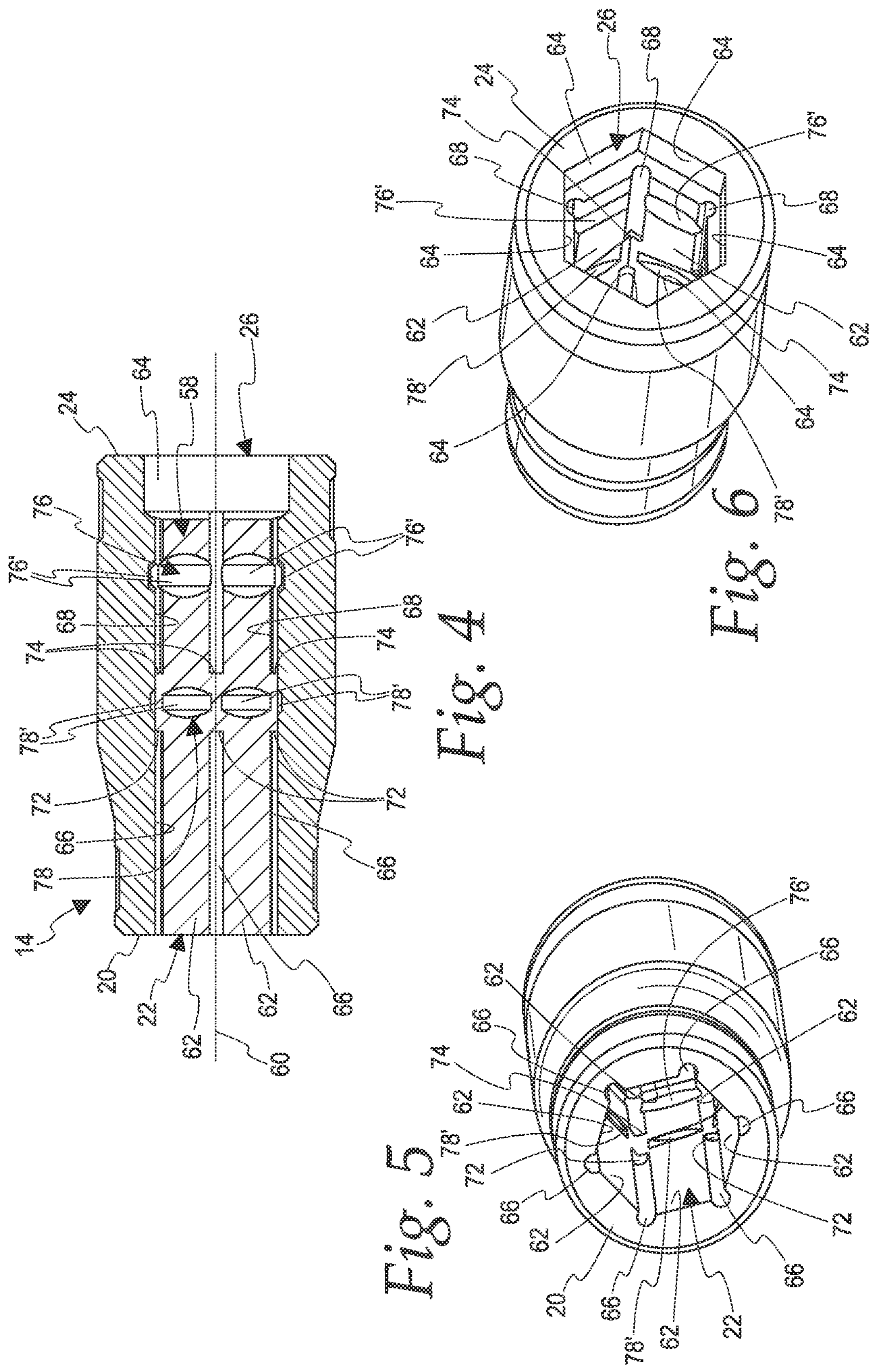
FIG. 4 is a section view taken along line 4-4 in FIG. 2 of a reversible socket of the nut driver tool of FIG. 1.
FIG. 5 is a perspective view of the reversible socket of FIGS. 1 and 4.
FIG. 6 is another perspective view of the reversible socket of FIGS. 1 and 4, but taken from an opposite end from the perspective view of FIG. 5.
Figure 8:
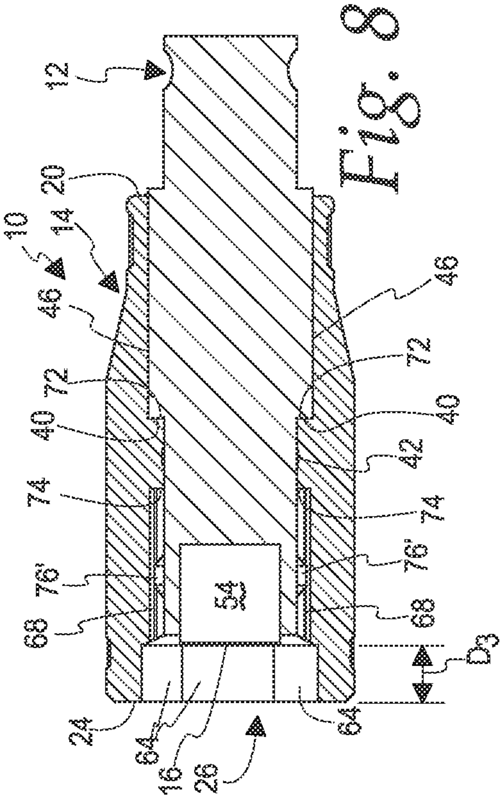
FIG. 8 is a view similar to FIG. 7, but showing the reversible socket in an orientation that is reversed from the orientation shown in FIG. 7.
Figure 7:
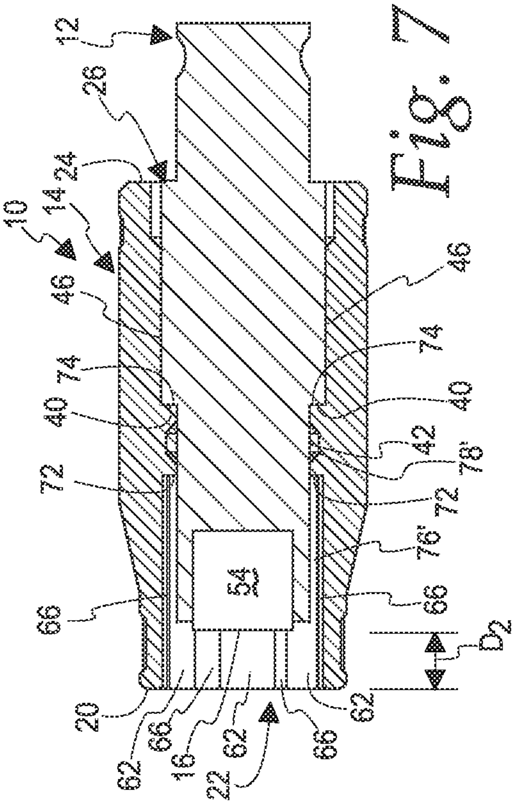
FIG. 7. is an enlarged section view taken along line 7-7 in FIG. 2 with a portion of the drive shank not shown.
Figure 9:
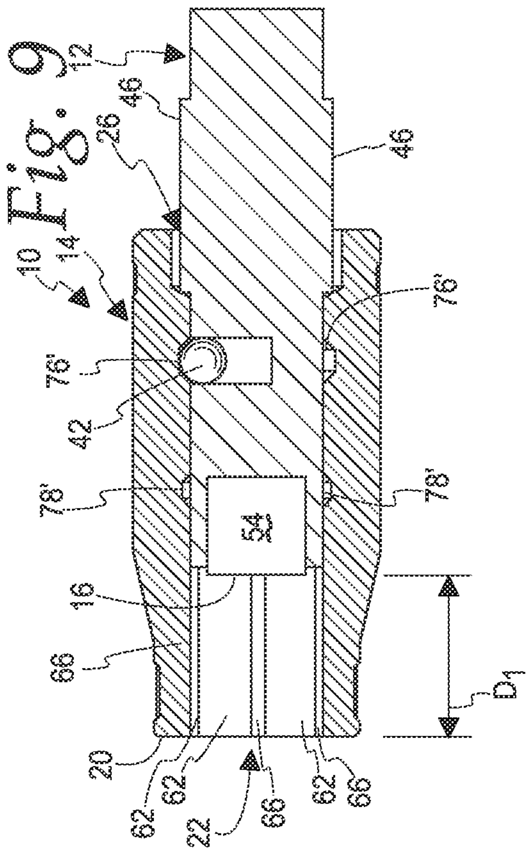
FIG. 9 is a view similar to FIG. 4, but showing the reversible socket in a position on the drive shank that is different from the positions shown in FIGS. 7 and 8.
Figure 12:
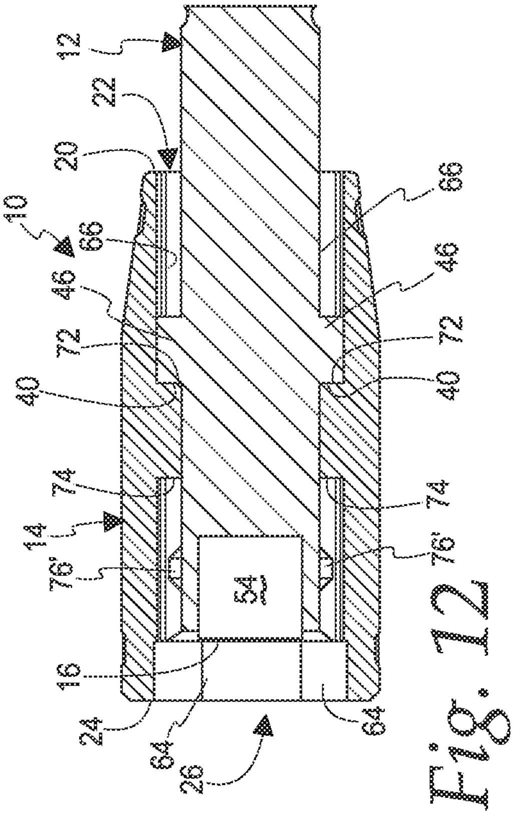
FIG. 12 is a view similar to FIG. 8, but showing the embodiment of FIG. 11.
Figure 14:
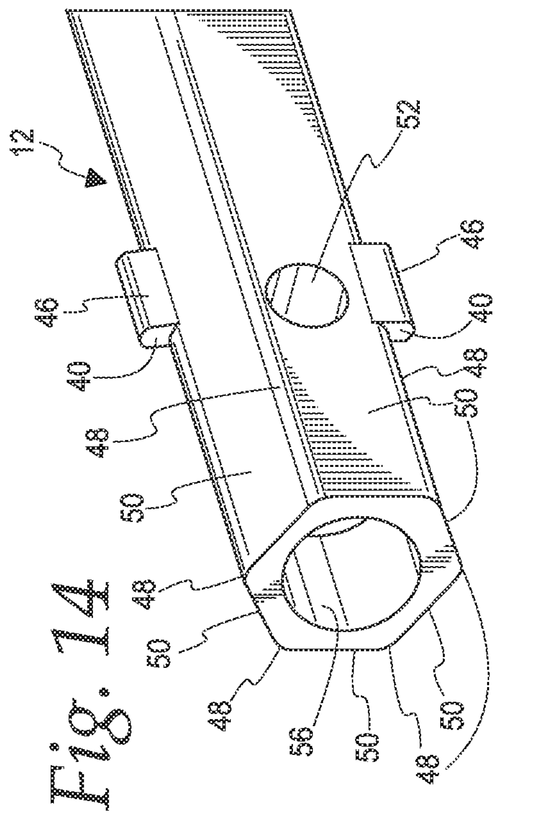
FIG. 14 is a view similar to FIG. 10, but showing the drive shank of the embodiment of FIGS. 11 and 12.
Figure 11:
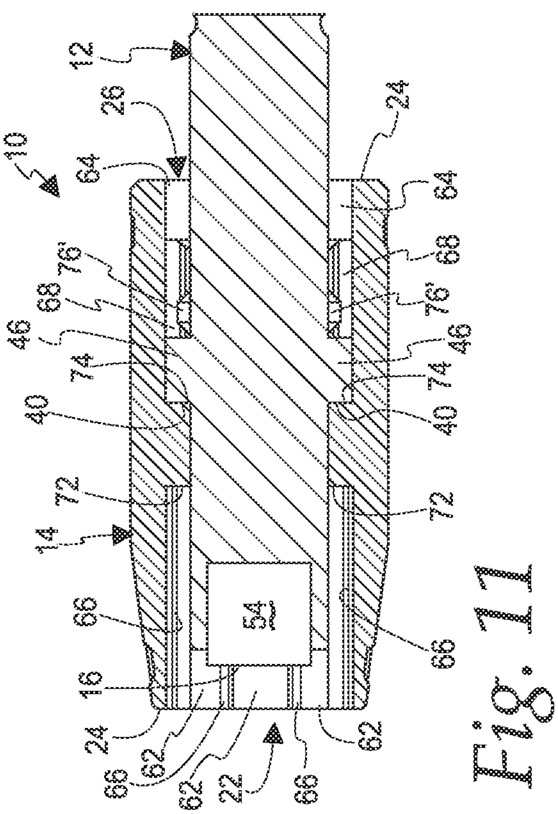
FIG. 11 is a view similar to FIG. 7, but showing another embodiment of the nut driver tool according to this disclosure.

As best seen in FIGS. 1-3, a nut driver 10 includes an elongate drive shank 12 and a reversible socket 14. As best seen in FIG. 3, the drive shank 12 has a socket-mounting end 16 opposite a driver engagement end 18. As best seen in FIGS. 4-6, the socket has a first end 20 with a first hex socket opening 22 sized to engage a hexagonal profile of a first size, and a second end 24 with a second hex socket opening 26 sized to engage a hexagonal profile of a second size. The second size is larger than the first size, and in the illustrated and preferred embodiment, the first size is ¼ inch hex socket and the second size is 5⁄16 inch hex socket. The socket 14 can be releasably mounted on the drive shank 12 in either a first orientation, shown in FIGS. 1, 2, 7 and 9, that presents the first hex socket opening 22 for use, or a second orientation, shown in FIG. 8, that presents the second hex socket opening 26 for use. Additionally, in the first orientation, the socket 14 can be releasably mounted in either a screw head receiving position, as shown in FIGS. 1 and 7, or a drive bit receiving position, as shown in FIG. 9. In the second orientation, the socket 14 is releasably mounted in a second screw head receiving position, as shown in FIG. 8.

As best seen in FIG. 3, in the illustrated embodiment, the drive shank 12 extends along a longitudinal axis 28 and has uniform, hexagonal shaped cross-sectional profile over the majority of its length. The drive shank 12 has a socket engagement portion 30 extending over a length adjacent the socket-mounting end 16, and a driver engagement portion 32 extending over a length adjacent the driver engagement end 18. The socket engagement portion 30 is configured to provide the releasable mounting of the socket 14 as mentioned above and discussed more fully below. The driver engagement portion 32 is configured to allow a drive member (such as the type of handle commonly employed on a screw or nut driver, or any common bit chuck used on a powered driver tool) to operably engage the shank 12 to transmit a drive torque to the socket 14 via the shank 12.

Figure 10:
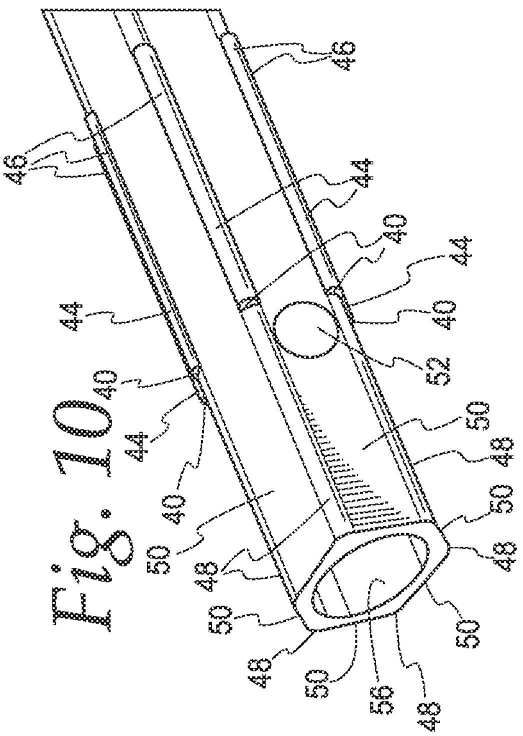
FIG. 10 is an enlarged perspective view of an end portion of the drive shank of FIGS. 1, 2, and 7-9, with selected components removed for purposes of illustration.

In the embodiment shown in FIG. 1-9, the socket engagement portion 30 includes 6 socket stop surfaces 40 facing the socket-mounting end 16 and a detent 42 located between the socket-mounting end 16 and the socket stop surfaces 40. As best seen in FIGS. 3 and 10, each of the stop surfaces 40 is defined on an end 44 of a corresponding elongate rib 46, with each of the ribs 46 extending along an intersection 48 of two planar surfaces 50 of the shank 12. It should be understood that there are six planar surfaces 50 and six intersections 48 that the hexagonal shaped cross-sectional profile of the drive shank 12. As best seen in FIG. 3, the detent 42 extends outwardly from one of the surfaces 50 and the detent 42 is preferably a spring biased ball detent received in a bore 52 that is transverse to the axis 28. In illustrated embodiment, the shank 12 further includes a magnet 54 defining the socket-mounting end 16, with the magnet fixed in a bore 56 centered on the axis 28.

As best seen in FIG. 4, the illustrated socket 14 includes a through opening 58 connecting the first and second hex socket openings 22 and 26, with all three openings 22, 26, and 58 being centered on a longitudinal axis 60 that is coaxial with the axis 28 when the socket 14 is mounted on the shank 12. As best seen in FIGS. 5 and 6, in the illustrated embodiments each of the openings 22, 26, and 58 have a hexagonal shape defined by inwardly facing planar surfaces, with six inwardly facing planar surfaces 62 defining the hexagonal shape of the openings 22 and 58 and six inwardly facing planar surfaces 64 defining the hexagonal shape of the opening 26. It should be appreciated that because the planar surfaces 62 define the hexagonal shape for both the opening 22 and the through opening 58 in the illustrated embodiments, the through opening 58 also provides a ¼ inch hex socket size that serves as an extension of the ¼ inch hex socket of the opening 22. Linear grooves 66 and 68 extend parallel to the axis 60 at the intersections of the planar surfaces 62 in both of the opening 22 and 58, respectively. The illustrated socket 14 further includes six first stop surfaces 72 facing the first end 20, with each of the stop surfaces 72 aligned with and defining an end of a corresponding one of the grooves 66, and six second stop surfaces 74 facing the second end 24, with each stop surface 74 aligned with and defining an end of a corresponding one of the grooves 68.

As best seen in FIGS. 4-6, the socket 14 further includes a first detent engagement feature 76 and a second detent engagement feature 78. In the embodiment of FIG. 1-10, the first and second detent engagement features 76 and 78 are provided in the form of annular grooves that are centered on the axis 60 and that produce reliefs 76' and 78' that can receive the detent 42 in each of the corresponding inwardly facing planar surfaces 62.

As best seen in FIG. 4, the first detent engagement feature 76 is located between the second end 24 and the second stop surfaces 74. As best seen in FIG. 9, the first detent engagement feature 76 is configured to engage the detent 42 with the socket 14 in the first orientation and in the drive bit receiving position. In this orientation and position, the shank 12 extends through the second hex socket opening 26 and the socket-mounting end 16 is spaced from the first end 22 by a first predetermined distance $D_1$ to allow a drive bit to be engaged in the first hex socket opening 22. In this regard, it is preferred that the tool be configured, including the distance D1, so that any commonly available ¼ inch drive bit can be engaged for use in the opening 22.

The second detent engagement feature 78 is located between the first stop surfaces 72 and the second stop surfaces 74, as best seen in FIG. 4. As best seen in FIG. 7, the second detent engagement feature 78 is configured to engage the detent 42 with the socket 14 in the first orientation and in the screw head receiving position. In this orientation and position, the socket stop surfaces 40 abut against the second stop surfaces 74, the shank 12 extends through the second hex socket opening 26, and the socket-mounting end 16 is spaced from the first end 20 by a second predetermined distance $D_2$ to receive a hex screw head of the first size. The second predetermined distance $D_2$ is less than the first predetermined distance $D_1$. As best seen in FIG. 8, the second detent engagement feature 78 is also configured to engage the detent 42 with the socket 14 in the second orientation and in the second screw head receiving position. In this orientation and position, the socket stop surfaces 40 are abutted against the first stop surfaces 72, the shank 12 extends through the first hex socket opening 22, and the socket-mounting end 16 is spaced from the second end 24 by a third predetermined distance $D_3$ to receive a hex screw head of the second size. In this regard, it is preferred that the distances $D_2$ and $D_3$ be selected so that the each of the openings 22 and 26 can fully engage the hex washer head of commonly used sheet metal screws.

Figure 13:
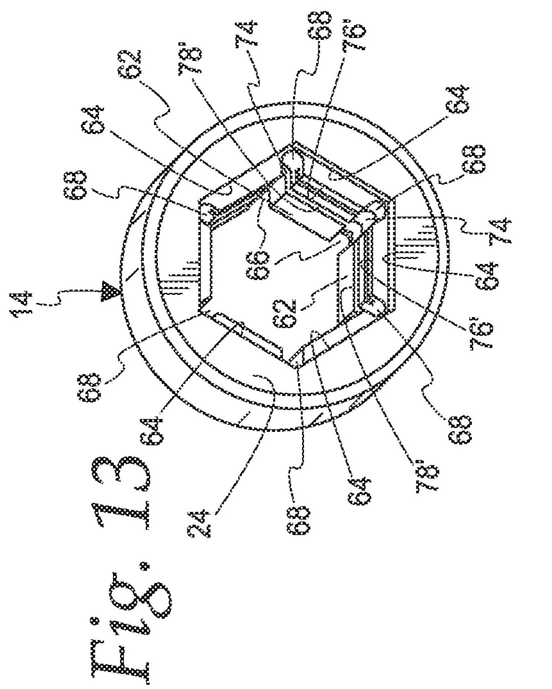
FIG. 13 is a perspective view of the reversible socket of the embodiment of FIGS. 11 and 12.
Figure 16:
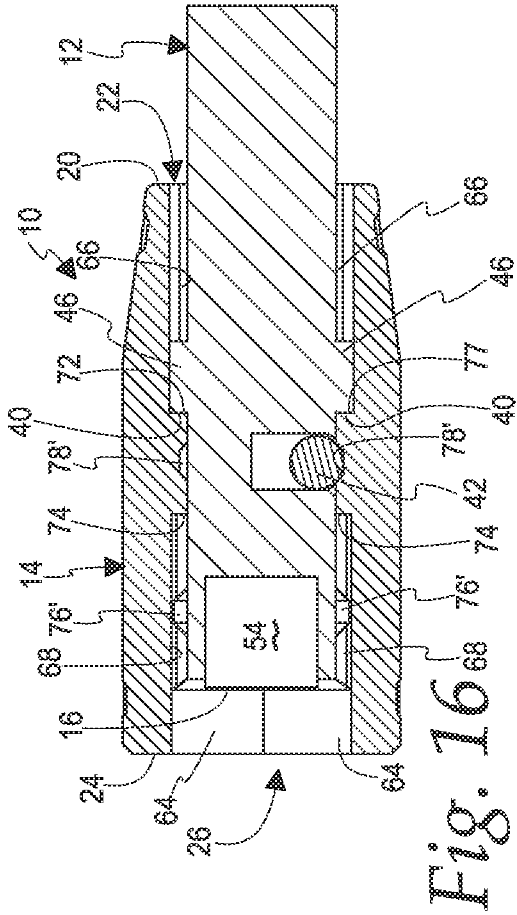
FIG. 16 is a view similar to FIGS. 8 and 12, but showing the embodiment of FIG. 15.
Figure 18:
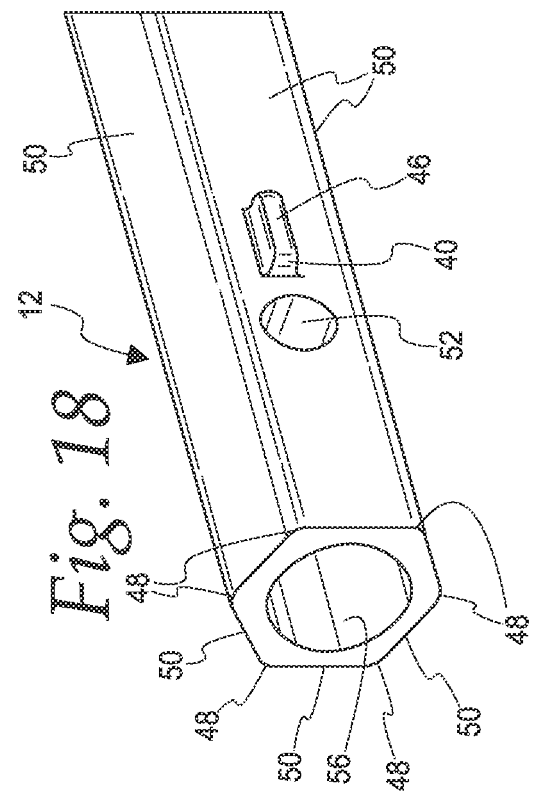
FIG. 18 is a view similar to FIGS. 10 and 14, but showing the drive shank of the embodiment of FIGS. 15 and 16.
Figure 15:
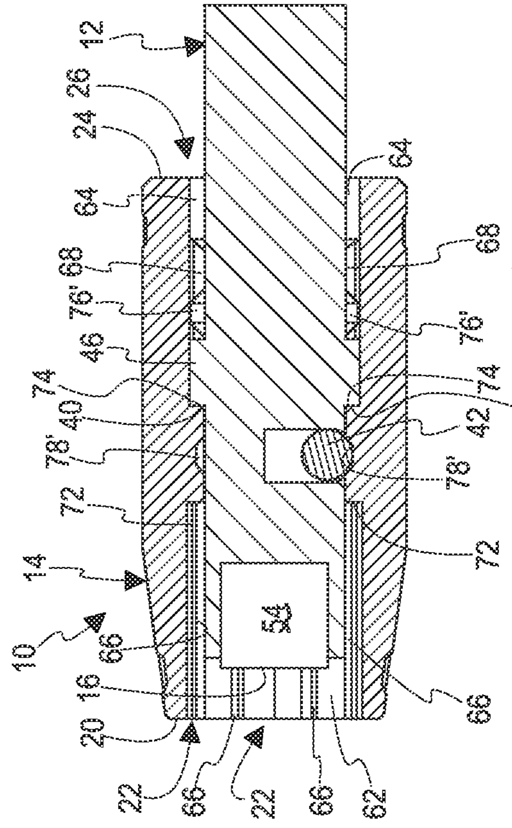
FIG. 15 is a view similar to FIGS. 7 and 11, but showing yet another embodiment of the nut driver tool according to this disclosure.

An alternate embodiment of the tool 10 is shown in FIGS. 11-14. In this embodiment, there are only two of the socket stop surfaces 40 and two of the ribs 46, with each of the ribs 46 extending radially outwardly from the corresponding intersection 48 further ("taller") than the embodiment of FIGS. 1-10. Each of the linear grooves 66 and 68 of this embodiment are also deeper to accommodate the "taller" ribs 46, as best seen in FIG. 13.

Figure 17:
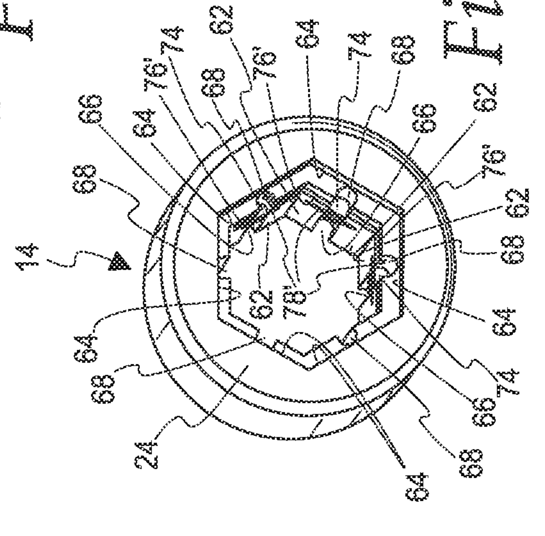
FIG. 17 is a view similar to FIG. 13, but showing the reversible socket of the embodiment of FIGS. 15 and 16.
Figure 19:
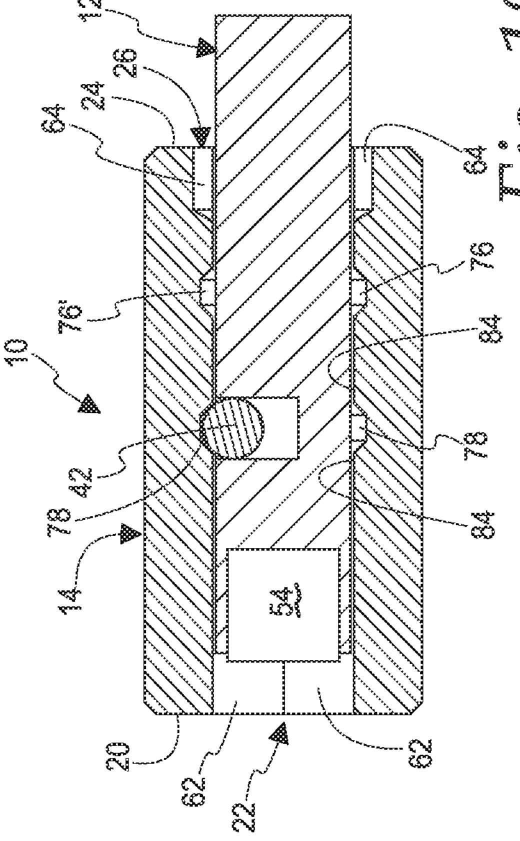
FIG. 19 is a view similar to FIGS. 7, 11, and 15, but showing an additional embodiment of the nut driver tool according to this disclosure.
Figure 20:
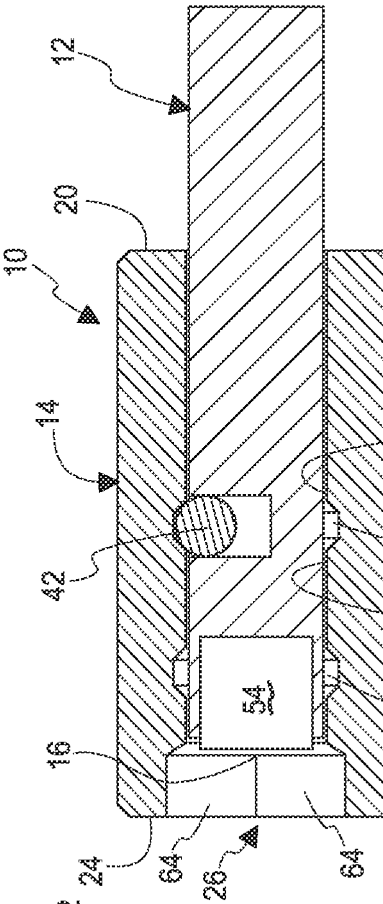
FIG. 20 is a view similar to FIGS. 8, 12, and 16, but showing the embodiment of FIG. 19.
Figure 21:
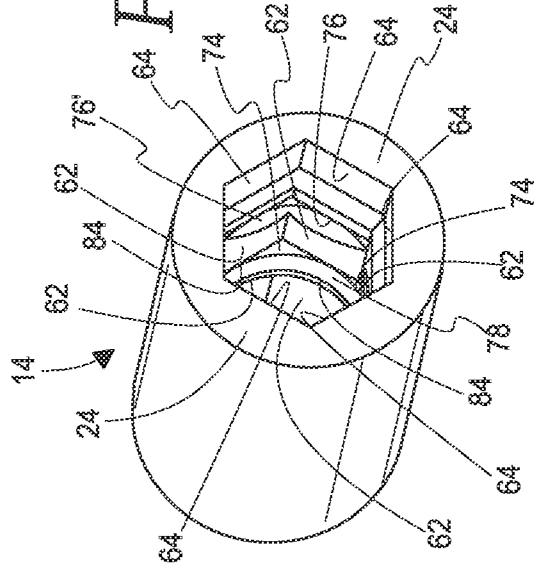
FIG. 21 is a view similar to FIGS. 13 and 17, but showing the reversible socket of the embodiment of FIGS. 19 and 20.

Another alternate embodiment of the tool 10 is illustrated in FIGS. 15-18. In this embodiment, there are again only two of the "taller" ribs 46, but each the ribs 46 extend outwardly from a corresponding one of the planar surfaces 50, rather than from an intersection 48. As best seen in FIG. 17, this requires that each of the linear grooves 66 and 68 be formed in a corresponding one of the inwardly facing planar surfaces 62 rather than at the intersection of two of the surfaces 62.

Figure 22:
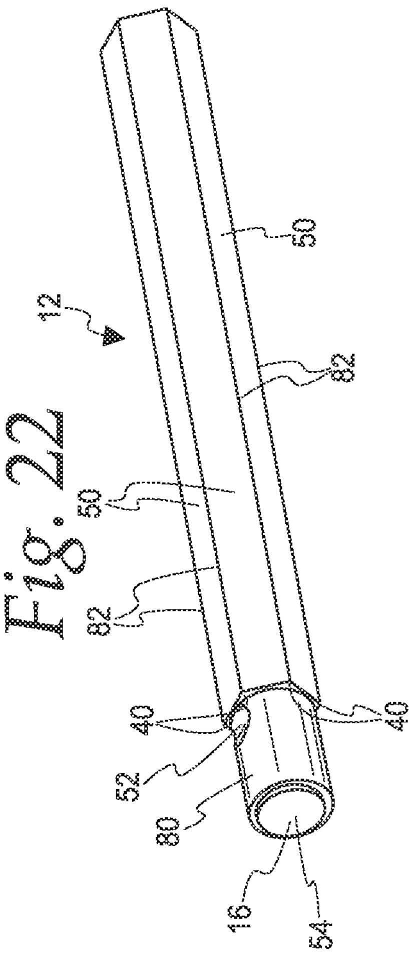
FIG. 22 is a view similar to FIGS. 10, 14, and 18, but showing the drive shank of the embodiment of FIGS. 19 and 20.

Yet another alternate embodiment of the tool 10 can be seen in FIGS. 19-22. In this embodiment and as best seen in FIG. 22, there are no ribs 46 and the socket engagement portion 30 of the shank 12 includes a cylindrical portion 80 extending from the socket-mounting end 16 to the socket stop surfaces 40. Each of the six stop surfaces 40 extending radially outwardly from the surface of the cylindrical portion 80 to a corresponding intersection 82 of two of the outwardly facing planar surfaces 50. The reversible socket 14 of this embodiment includes inwardly facing cylindrical surfaces 84 on each side of the second detent engagement feature 78, with the stop surfaces 72 and 74 extending between the surfaces 84 and the planar surfaces 62 adjacent intersections of the planar surfaces 62.

Figure 23:
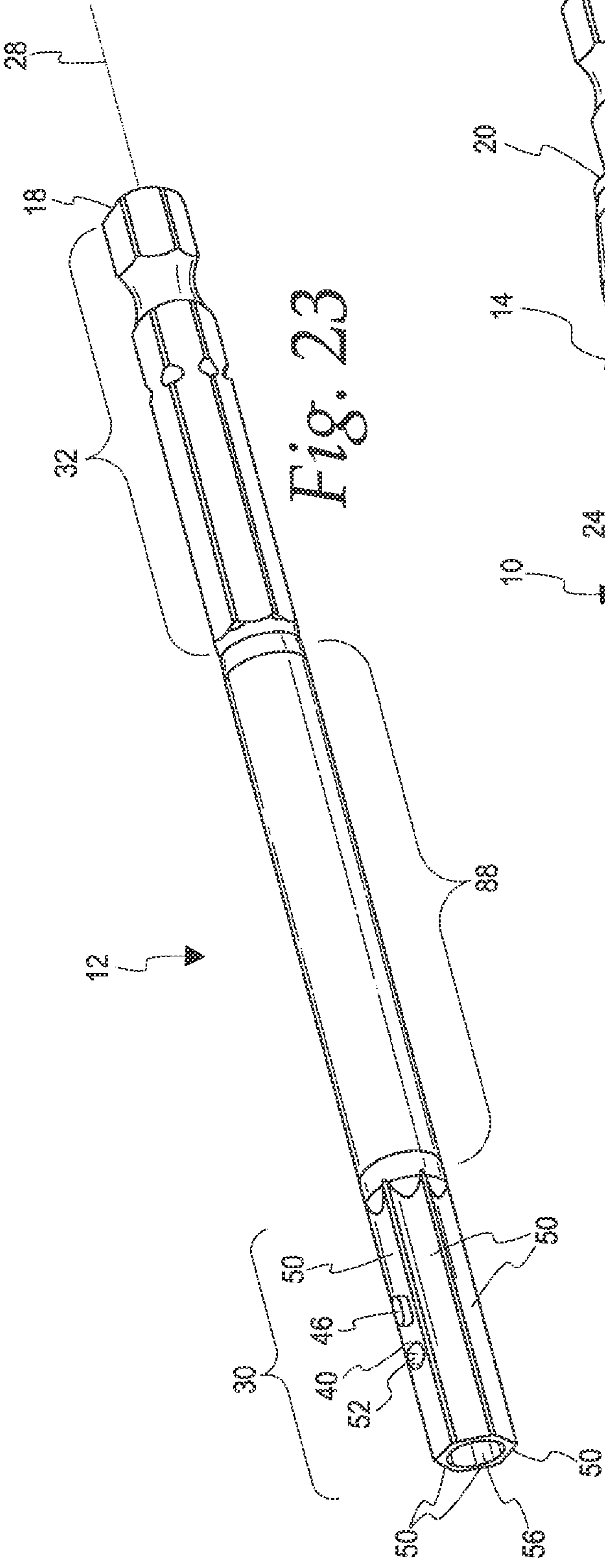
FIG. 23 is a perspective view of another embodiment of the drive shank according to this disclosure.
Figure 24:
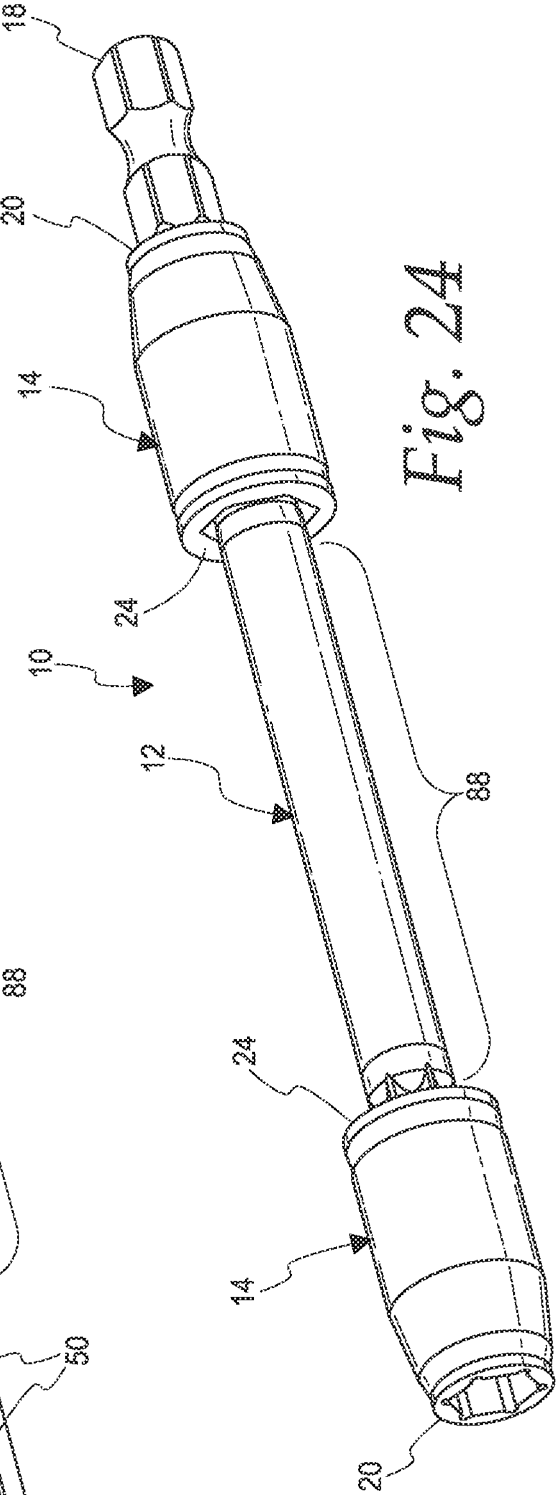
FIG. 24 is a perspective view of another embodiment of the nut driver tool utilizing the drive shank of FIG. 23 and an additional reversible socket according to this disclosure.
Figure 27:
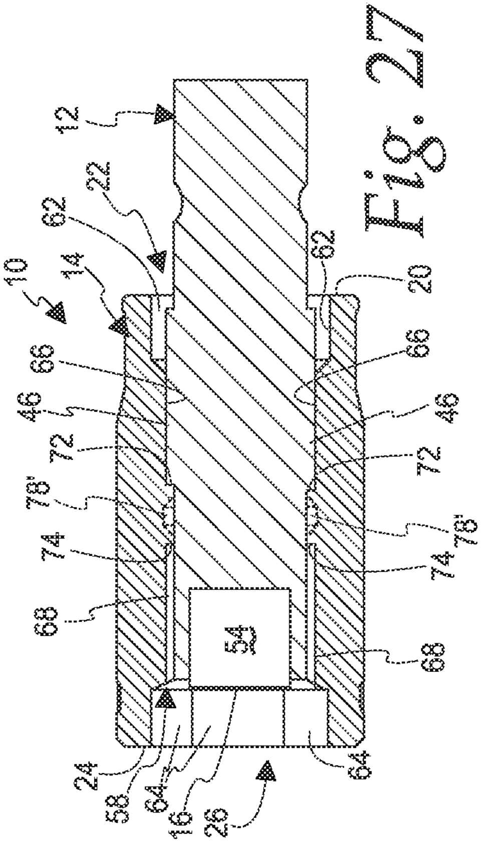
FIG. 27 is a view similar to FIG. 8, but showing the embodiment of the socket illustrated in FIGS. 25 and 26.
Figure 28:
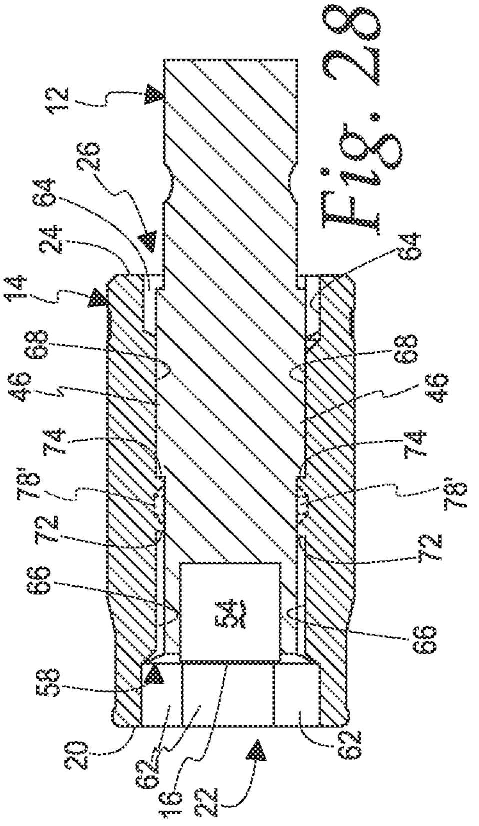
FIG. 28 is a view similar to FIG. 27, but showing the socket in an orientation that is reversed from the orientation shown in FIG. 27.
Figure 25:
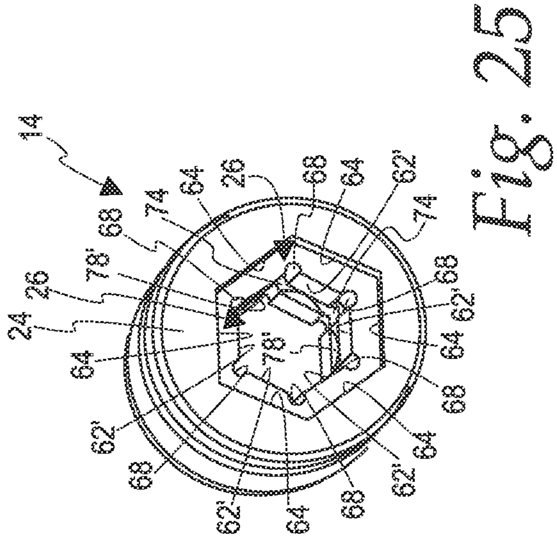
FIG. 25 is a perspective view similar to FIG. 6, but showing another embodiment of the reversible socket.
Figure 26:
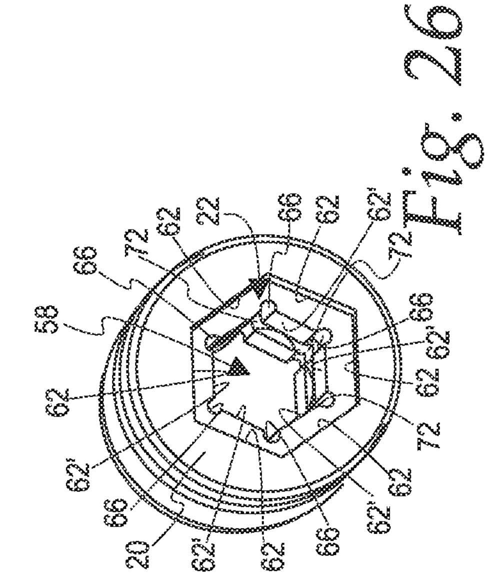
FIG. 26 is a perspective view of the socket of FIG. 25 but taken from an opposite end from the perspective view of FIG. 25.
Figure 31:
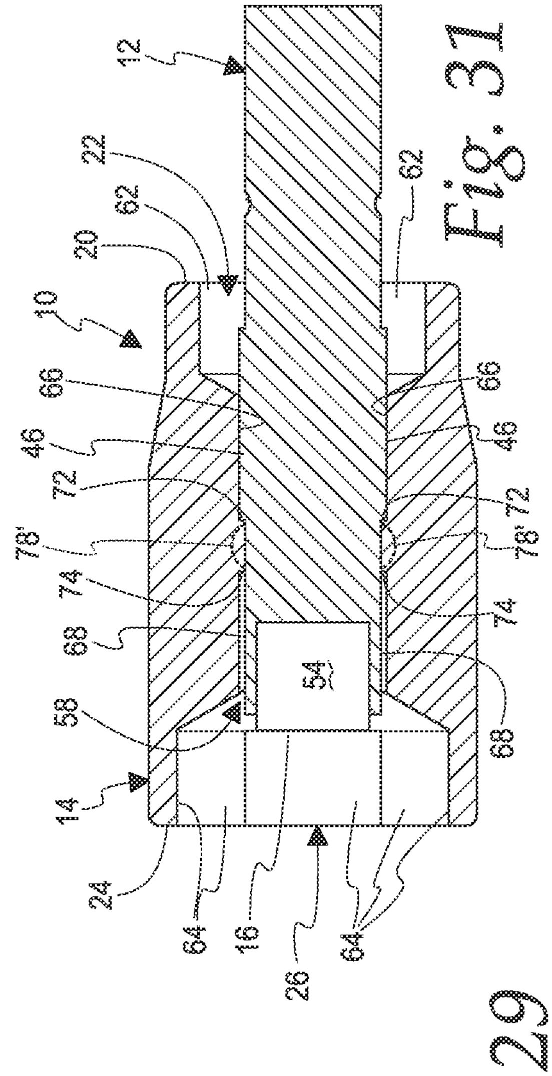
FIG. 31 is a view similar to FIGS. 8 and 27, but showing the embodiment of the socket illustrated in FIGS. 29 and 30.
Figure 32:
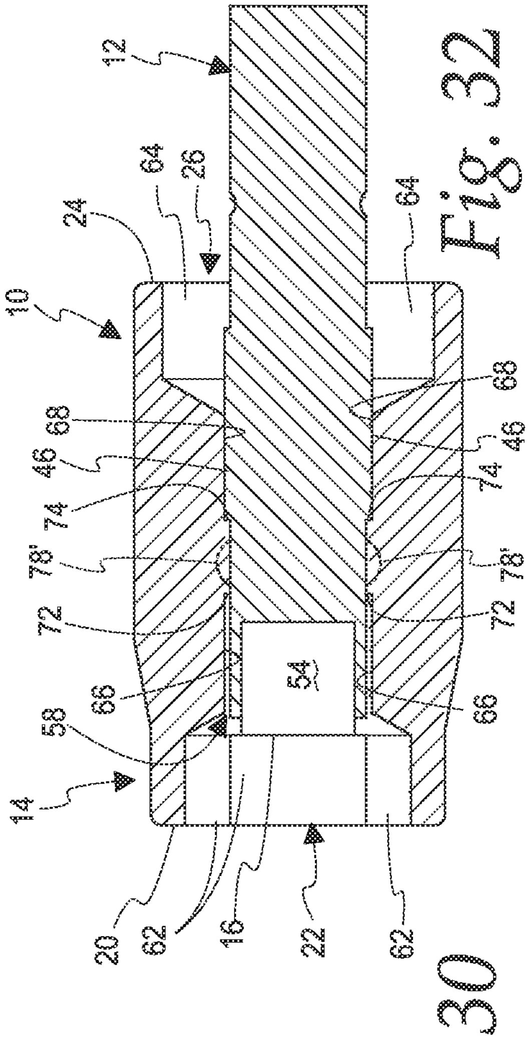
FIG. 32 is a view similar to FIG. 31, but showing the socket in an orientation that is reversed from the orientation shown in FIG. 31.
Figure 29:
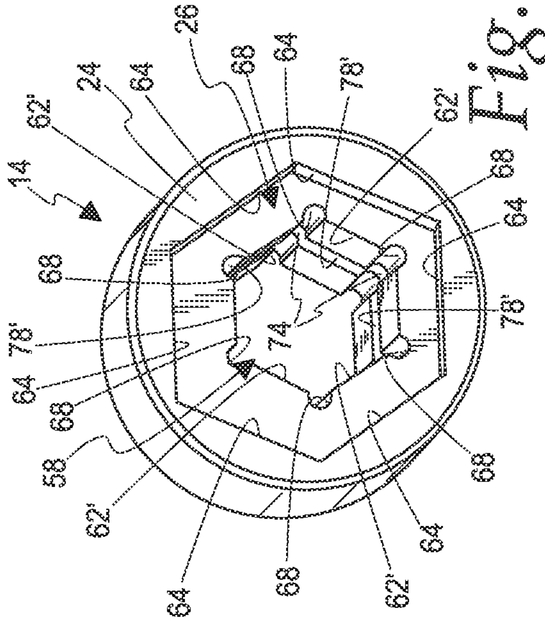
FIG. 29 is a perspective view similar to FIGS. 6 and 25, but showing yet another embodiment of the reversible socket.
Figure 30:
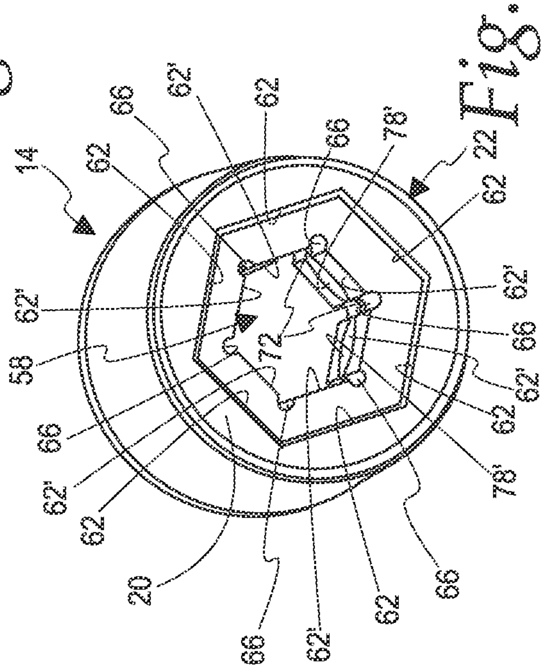
FIG. 30 is a perspective view of the socket of FIG. 29 but taken from an opposite end from the perspective view of FIG. 29.

Another embodiment of the drive shank 12 is shown in FIGS. 23 and 24. wherein the drive shank 12 includes a cylindrical portion 88 extending over a length between the socket engagement portion 30 and the driver engagement portion 32. While the illustrated embodiment shows two of the "taller" ribs 46 similar to the embodiment of the shank 12 shown in FIGS. 16-18, the cylindrical portion 88 can be incorporated in any of the embodiment of the drive shank 12 discussed herein. As best seen in FIG. 24, an additional reversible socket 14 can be included with the tool 10 and can be stored on the shank 12 on part of the driver engagement portion 32. While the additional socket 14 is shown in connection with the drive shank 12 of FIG. 23, it should be understood that the additional socket 14 can be incorporated with any of the embodiments of the drive shank 12 discussed herein and can take the form of any of the embodiments of the socket 14 discussed herein, except for the embodiments shown in FIGS. 19-22.

FIGS. 25-32 illustrate two additional embodiments of the reversible socket 14 that can be utilized with the drive shanks 12 disclosed herein. For purposes of illustration, these sockets 14 are shown in connection with the drive shank 12 shown in FIGS. 4-10, but it should be understood that these sockets 14 can be configured to be compatible with any of the drive shanks 12 disclosed herein. The sockets 14 shown in FIGS. 25-32 provide larger sizes for each of the hex socket openings 22 and 26, with the through opening 58 having the same ¼ hexagonal shape and size as the embodiments of the socket 14 shown in FIGS. 1-24. Because the socket opening 22 is larger than ¼ inch in these embodiments of the socket 14, the hexagonal shape of the through opening 58 is defined by inwardly facing planar surface 62' that are distinct from the surface 62 that define the hexagonal shape of the opening 22. Further in this regard, the linear grooves 66 and 68 are located at the intersections of the surfaces 62' rather than at the intersections of the surfaces 62 of the opening 22. In the embodiment illustrated in FIGS. 25-28, the opening 22 is an 11/32 inch hex socket and the opening 26 is a ⅜ inch hex socket. In the embodiment illustrated in FIGS. 29-32, the opening 22 is a 7/16 inch hex socket and the opening 26 is a ½ inch hex socket. The illustrated embodiments of the socket 14 do not included the detent engagement feature 76, but it should be understood that the detent engagement feature 76 can easily be added to the sockets 14 shown in FIGS. 25-32 to provide the same if desired for some applications.

Figure 33:
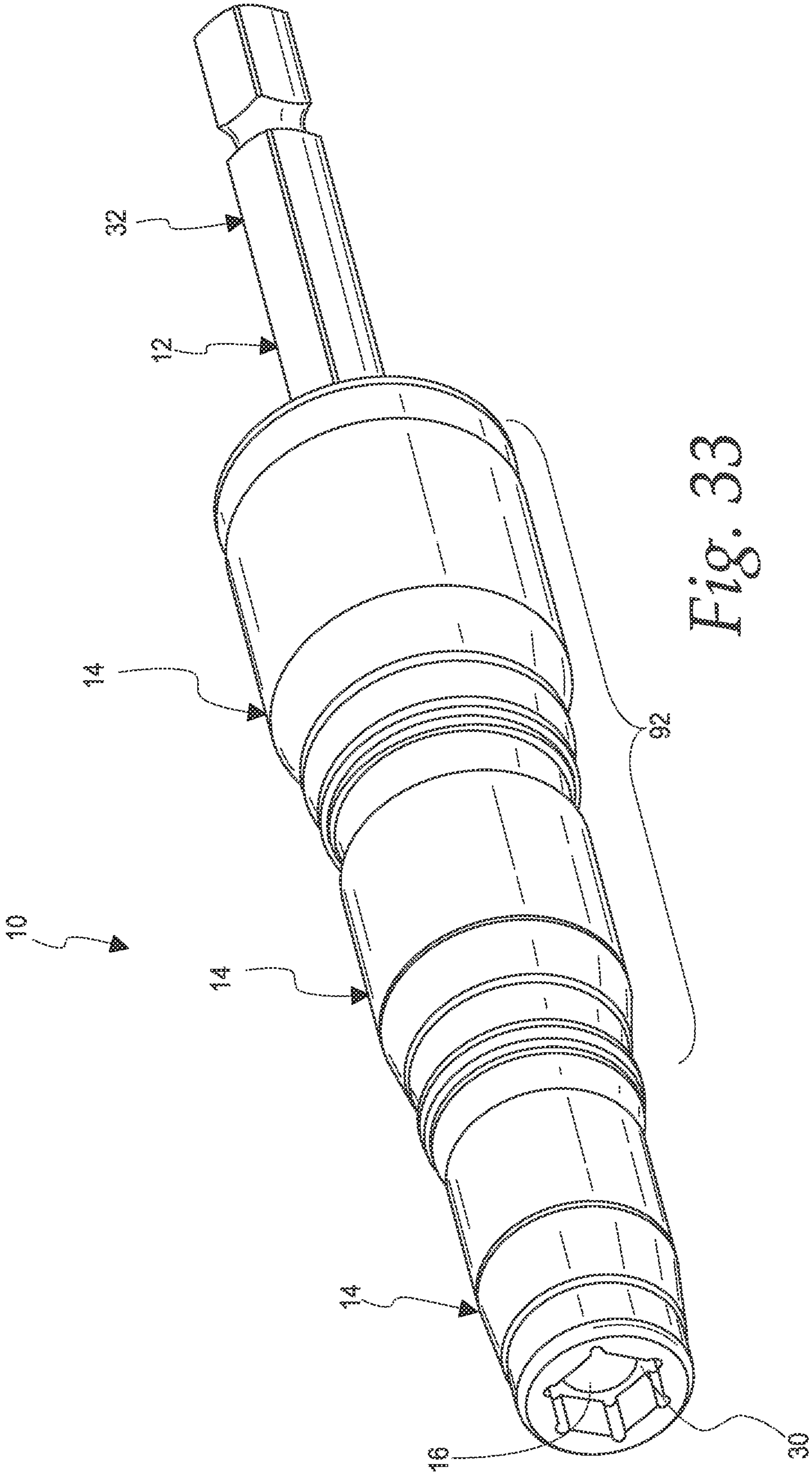
FIG. 33 is a perspective view of another embodiment of the nut driver tool utilizing the drive shank of FIGS. 1-3, and 7-10 and the sockets of FIGS. 4-9, 25-28, and 29-32.

FIG. 33 shows an embodiment of the nut driver tool 10 wherein additional sockets 14 according to the embodiments of the socket 14 shown in FIGS. 25-32 are mounted in a storage position 92 on the drive shank 12 between the portion 32 of the drive shank 12 and a socket 14 according to the embodiments shown in FIGS. 1-24 engaged with the portion 30 of the drive shank 12. This embodiment of the nut driver 10 allows for each of the three illustrated sockets 14 to be engaged with the portion 30 of the drive shank 12 with the other two of the sockets 14 mounted in the storage position 92 while the tool 10 is used to drive a hex shaped nut or bolt head.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the nut driver tool 10 are shown in the figures, it should be understood that this disclosure anticipates variations in the specific details of each of the disclosed components and features of the nut driver tool 10 and that no limitation to a specific form, configuration, or detail is intended unless expressly and specifically recited in an appended claim.

For example, while specific and preferred forms have been shown for the socket openings 22 and 26, other configurations and sizes, such as a square drive shape, may be desirable depending upon the requirements of the specific application for the tool 10. Similarly, while hexagonal shapes are shown for the socket engagement portion 30 and the driver engagement portion 32, other shapes, such as a square shape, for either or both of the portions 30 and 32 may be desirable depending upon the requirements of the specific application for the tool 10. As another example, while a spring-biased ball detent 42 is preferred, in some applications it may be desirable to utilize a different type or form of detent, many of which or known, such as for example, a spring biased, cylindrical pin shaped detent or a C-clip/snap ring detent. As a further example, while it is preferred that the end 16 of the shank 12 include the magnet 54, in some applications it may be desirable for the end 16 not to include a magnet 54.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

What is claimed is:

1. A nut driver tool comprising:

an elongate drive shank including:

a socket-mounting end opposite a driver engagement end, a socket stop surface facing the socket-mounting end and spaced from the socket-mounting end, and a detent located between the socket-mounting end and the stop surface; and three reversible sockets, each reversible socket having:

a first end opposite a second end;

a first hex socket opening in the first end;

a second hex socket opening in the second end facing in an opposite direction from the first hex socket opening;

a through opening connecting the first and second hex socket openings to allow the drive shank to pass through the socket; and at least one detent engagement feature located between the first end and the second end configured to engage the detent with the socket mounted on the socket-mounting end of the drive shank;

wherein any two of the three reversible sockets can be mounted in a storage position on the drive shank between the socket-mounting end and the driver engagement end with the remaining one of the three reversible sockets engaged on the socket-mounting end to drive a hex shaped nut or bolt head; and wherein at least one of the three reversible sockets is configured to be mounted on the socket-mounting end in a first position with the socket-mounting end spaced from the first end by a first predetermined distance, and in a second position with the socket-mounting end spaced from the first end by a second predetermined distance that is less than the first predetermined distance, the at least one of the three reversible sockets facing the same direction in both the first and second positions.

2. The nut driver tool of claim 1 wherein each of the hex socket openings is sized to engage a hexagonal profile of a size that is different than any of the other hex socket openings.

3. A nut driver tool comprising:

an elongate drive shank comprising a socket-mounting end opposite a driver engagement end; and three reversible sockets, each reversible socket comprising:

a first end opposite a second end;

a first hex socket opening in the first end;

a second hex socket opening in the second end facing in an opposite direction from the first hex socket opening; and a through opening connecting the first and second hex socket openings to allow the drive shank to pass through the socket;

wherein any two of the three reversible sockets can be mounted in a storage position on the drive shank between the socket-mounting end and the driver engagement end with the remaining one of the three reversible sockets engaged on the socket-mounting end to drive a hex shaped nut or bolt head; and wherein at least one of the three reversible sockets is configured to be mounted on the socket-mounting end in a first position with the socket-mounting end spaced from the first end by a first predetermined distance, and in a second position with the socket-mounting spaced from the first end by a second predetermined distance that is less than the first predetermined distance, the at least one of the three reversible sockets facing the same direction in both the first and second positions; and wherein the elongate drive shank further comprises a detent, and each of the three reversible sockets further comprises at least one detent engagement feature located between the first end and the second end configured to engage the detent with the socket mounted on the socket-mounting end of the drive shank.

4. The nut driver tool of claim 3 wherein each of the hex socket openings is sized to engage a hexagonal profile of a size that is different than any of the other hex socket openings.

5. A nut driver tool comprising:

an elongate drive shank comprising a socket-mounting end opposite a driver engagement end; and three reversible sockets, each reversible socket comprising:

a first end opposite a second end;

a first hex socket opening in the first end;

a second hex socket opening in the second end facing in an opposite direction from the first hex socket opening; and a through opening connecting the first and second hex socket openings to allow the drive shank to pass through the socket;

wherein any two of the three reversible sockets can be mounted in a storage position on the drive shank between the socket-mounting end and the driver engagement end with the remaining one of the three reversible sockets engaged on the socket-mounting end to drive a hex shaped nut or bolt head; and wherein at least one of the three reversible sockets is configured to be mounted on the socket-mounting end in a first position with the socket-mounting end spaced from the first end by a first predetermined distance, and in a second position with the socket-mounting spaced from the first end by a second predetermined distance that is less than the first predetermined distance, the at least one of the three reversible sockets facing the same direction in both the first and second positions; and wherein the elongate drive shank further comprises a socket stop surface facing the socket-mounting end and spaced from the socket-mounting end.

6. A nut driver tool comprising:

an elongate drive shank comprising a socket-mounting end opposite a driver engagement end; and three sockets, each socket comprising:

a first end opposite a second end;

a hex socket opening in the first end; and a through opening connecting the first and second ends to allow the drive shank to pass through the socket;

wherein any two of the three sockets can be mounted in a storage position on the drive shank between the socket-mounting end and the driver engagement end with the remaining one of the three sockets engaged on the socket-mounting end to drive a hex shaped nut or bolt head; and wherein at least one of the three sockets is configured to be mounted on the socket-mounting end in a first position with the socket-mounting end spaced from the first end by a first predetermined distance, and in a second position with the socket-mounting end spaced from the first end by a second predetermined distance that is less than the first predetermined distance, the at least one of the three reversible sockets facing the same direction in both the first and second positions; and wherein the elongate drive shank further comprises a detent, and each of the three sockets further comprises at least one detent engagement feature located between the first end and the second end configured to engage the detent with the socket mounted on the socket-mounting end of the drive shank.

7. A nut driver tool comprising:

an elongate drive shank comprising a socket-mounting end opposite a driver engagement end; and three sockets, each socket comprising:

a first end opposite a second end;

a hex socket opening in the first end; and a through opening connecting the first and second ends to allow the drive shank to pass through the socket;

wherein any two of the three sockets can be mounted in a storage position on the drive shank between the socket-mounting end and the driver engagement end with the remaining one of the three sockets engaged on the socket-mounting end to drive a hex shaped nut or bolt head; and wherein at least one of the three sockets is configured to be mounted on the socket-mounting end in a first position with the socket-mounting end spaced from the first end by a first predetermined distance, and in a second position with the socket-mounting end spaced from the first end by a second predetermined distance that is less than the first predetermined distance, the at least one of the three reversible sockets facing the same direction in both the first and second positions; and wherein the elongate drive shank further comprises a socket stop surface facing the socket-mounting end and spaced from the socket-mounting end.

8. The nut driver tool of claim 7 wherein each of the hex socket openings is sized to engage a hexagonal profile of a size that is different than any of the other hex socket openings.

9. The nut driver tool of claim 7 wherein each of the sockets is a reversible socket and each socket further comprises a hex socket opening in the second end facing in an opposite direction from the first hex socket opening.

* * * * *